(12) United States Patent
Parod et al.

(10) Patent No.: US 7,878,429 B2
(45) Date of Patent: Feb. 1, 2011

(54) SOLAR POWERED IRRIGATION MACHINE

(75) Inventors: Richard W. Parod, Elkorn, NE (US); Charles H. Meis, Albion, NE (US)

(73) Assignee: Lindsay Corporation, Omaha, NE (US)

( * ) Notice: Subject to any disclaimer, the term of this patent is extended or adjusted under 35 U.S.C. 154(b) by 564 days.

(21) Appl. No.: 11/863,391

(22) Filed: Sep. 28, 2007

(65) Prior Publication Data
US 2009/0084615 A1 Apr. 2, 2009

(51) Int. Cl.
*B05B 3/00* (2006.01)
(52) U.S. Cl. .................................. 239/735; 239/726
(58) Field of Classification Search ......... 239/722–743, 239/1
See application file for complete search history.

(56) References Cited

U.S. PATENT DOCUMENTS

| | | | |
|---|---|---|---|
| 4,283,914 A | 8/1981 | Allen | |
| 4,342,196 A | 8/1982 | Yeh | |
| 4,372,114 A | 2/1983 | Burnham | |
| 4,378,089 A | 3/1983 | Wilken et al. | |
| 4,439,111 A | 3/1984 | Seidel et al. | |
| 4,444,011 A | 4/1984 | Kolin | |
| 4,522,338 A | 6/1985 | Williams | |
| 4,535,813 A * | 8/1985 | Spain | 137/625.5 |
| 4,551,978 A | 11/1985 | O'Hare | |
| 4,627,241 A | 12/1986 | Johnston | |
| 4,666,376 A | 5/1987 | Solomon | |
| 4,698,973 A | 10/1987 | Johnston | |
| 4,720,978 A | 1/1988 | Spacer | |
| 4,765,144 A | 8/1988 | Spacer | |
| 4,980,574 A * | 12/1990 | Cirrito | 307/21 |
| 5,160,214 A | 11/1992 | Sakurai et al. | |
| 5,330,104 A | 7/1994 | Marcus | |
| 6,068,197 A * | 5/2000 | Tolson | 239/1 |
| 6,590,793 B1 | 7/2003 | Nagao et al. | |
| 6,672,335 B1 | 1/2004 | Welborn | |
| 6,709,198 B2 | 3/2004 | Wachtel | |
| 6,889,922 B1 | 5/2005 | Knight et al. | |
| 7,097,113 B2 | 8/2006 | Ivans | |
| 2005/0082390 A1 | 4/2005 | Ferrono et al. | |
| 2005/0205698 A1 | 9/2005 | Knight et al. | |
| 2006/0027677 A1 | 2/2006 | Abts et al. | |
| 2006/0032938 A1 | 2/2006 | Pomey et al. | |

FOREIGN PATENT DOCUMENTS

AU 9957086 A2 * 10/1999

* cited by examiner

*Primary Examiner*—Davis Hwu
(74) *Attorney, Agent, or Firm*—Hovey Williams LLP

(57) ABSTRACT

An apparatus and method of moving a mobile tower using solar power are disclosed for use with an irrigation system. The disclosed improvement includes a solar panel with a collecting surface to convert light energy to electrical energy, an electrical charge source in communication with the solar panel to receive electrical energy, and a motor to drive a ground-engaging wheel in communication with the electrical charge source. The improvement also includes a direction control system for regulating rotation of the solar panel and a tilt assembly for adjusting the angle of the solar panel to maintain the disposition of the collecting surface in alignment with the direction of incoming sunlight. The method of moving the mobile tower includes collecting light energy with a solar panel, converting the light energy into electrical energy, and driving a wheel of the mobile tower with a motor powered by the converted electrical energy.

19 Claims, 3 Drawing Sheets

US 7,878,429 B2

SOLAR POWERED IRRIGATION MACHINE

TECHNICAL FIELD

The present invention relates generally to agricultural irrigation systems. More particularly, the present invention concerns a solar powered irrigation machine that collects light energy, converts the light energy to electrical energy, and uses the electrical energy to power a drive motor on a mobile tower of the irrigation machine.

BACKGROUND

Agricultural irrigation systems, such as center pivot irrigation machines, are commonly used to irrigate crops. A center pivot irrigation machine typically includes, among other things, a central pivot communicating with a pressurized water supply, a series of mobile support towers connected to the central pivot and to one another by truss-type framework sections, an elevated water distribution conduit supported by the framework sections, and a number of sprinkler heads, spray guns, drop nozzles, or other fluid-emitting devices spaced along the length of the conduit. The mobile support towers are supported on wheels that are typically driven at slow speeds to move the system in a generally circular path about the central pivot to irrigate a large tract of land.

Conventionally, the wheels of the support towers are driven by a motor on each tower. Such an arrangement provides satisfactory performance, although those of ordinary skill in the art will appreciate that it is expensive to provide power to numerous multiple motors. Additionally, with a traditional central power source, such as at the central pivot, long power transmission devices, such as wires, cables, or the like, must extend out to the far reaches of the irrigation system in order to provide electrical power all the way to the motor on the tower and the end of the span. This necessary cost of transmitting electrical power is also expensive and can lead to costly repairs should the need arise or a problem be found within the power transmission lines.

SUMMARY

The present invention provides a solar powered irrigation machine that collects light energy, converts the light energy to electrical energy, and uses the electrical energy to power a drive motor on a mobile tower of the irrigation machine. The irrigation system is economical to operate as the motors are powered by the light energy from the sun, an abundant energy source, particularly in light of the fact that the location of many fields that must be irrigated is in an open location with considerable exposure to incoming sunlight.

According to one aspect of the present invention, an irrigation system having a liquid conduit that spans mobile towers is provided, each of the mobile towers including at least one ground-engaging wheel. A solar panel having a collecting surface is provided, wherein the solar panel is operable to collect light energy from the sun and convert the light energy into electrical energy. An electrical charge source is provided in electrical communication with the solar panel, wherein the electrical charge source receives the electrical energy from the solar panel. A motor is provided in electrical communication with the electrical charge source, wherein the motor receives the electrical energy from the electrical charge source and drives the ground-engaging wheel.

Another aspect of the present invention concerns a method of moving a mobile tower of an irrigation system by collecting light energy with a solar panel, converting the light energy into electrical energy, transmitting the electrical energy to a motor on a mobile tower, and driving the ground-engaging wheels of the mobile tower with the motor.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWINGS

A preferred embodiment of the present invention is described in detail below with reference to the attached drawing figures, wherein:

FIG. 4 is a fragmentary, perspective view on a reduced scale of an alternate embodiment of a solar powered center pivot irrigation system constructed in accordance with the principles of the present invention, including fixed solar panels.

Figure 1:
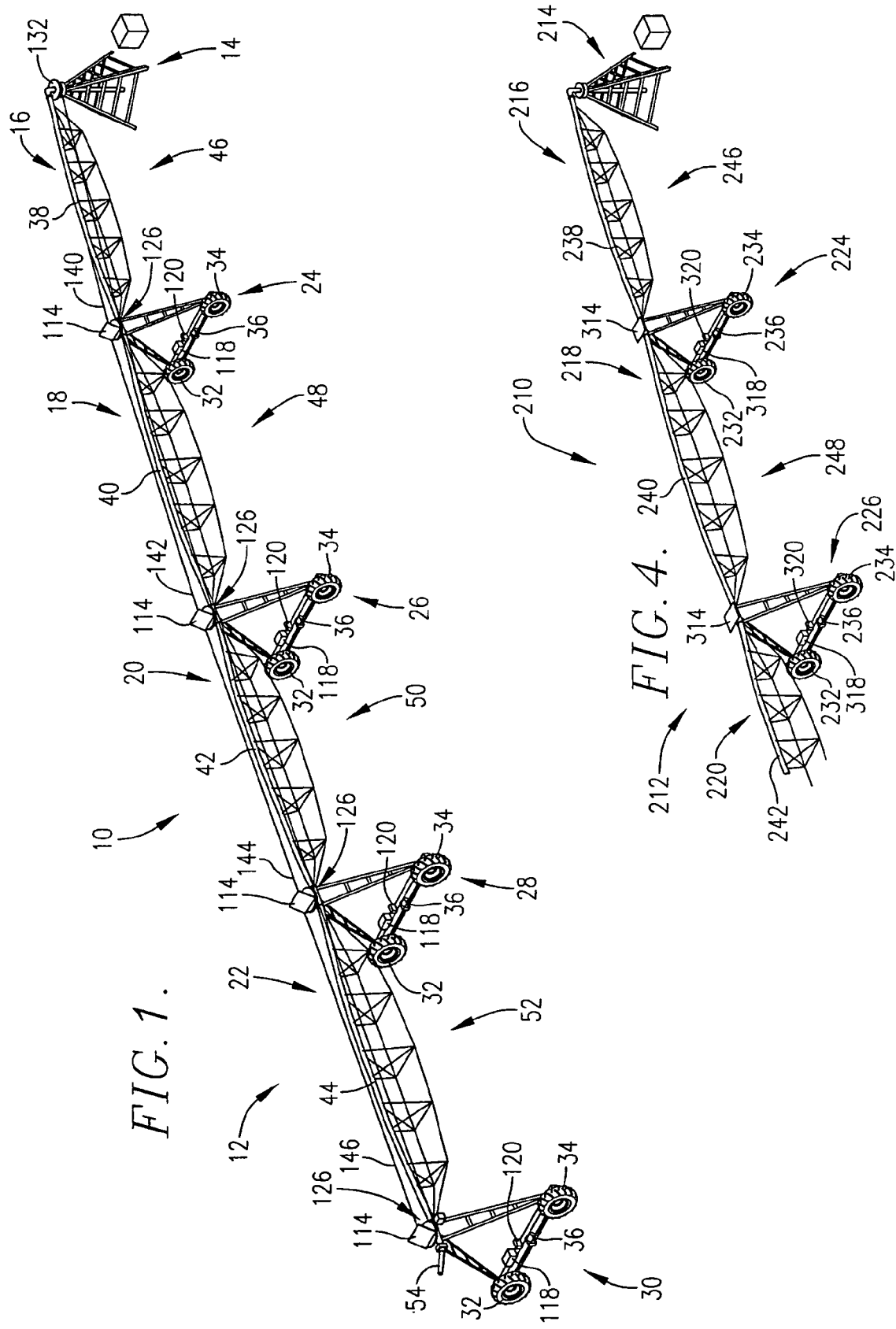
FIG. 1 is perspective view on a reduced scale of a solar powered center pivot irrigation system constructed in accordance with the principles of the present invention, including a solar panel direction control system.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an irrigation system 10 selected for purposes of illustration is a center pivot irrigation system that broadly includes a main section 12 and a central pivot 14. The central pivot 14 has access to a well, water tank, or other source of fluids (not shown). The source of fluids may be coupled with a tank or other source of agricultural products to inject fertilizers, pesticides, and/or other chemicals into the fluids for application during irrigation.

The main section 12 includes a number of interconnected spans 16, 18, 20, and 22 supported by mobile towers 24, 26, 28 (also referred to as intermediate towers), and an end tower 30. Those of ordinary skill in the art will appreciate that the irrigation system 10 may include any number of spans and mobile towers. It will also be recognized that the principles of the present invention are not limited to use with a center pivot system, but may also be employed with other types of irrigation systems, including for example, lateral move systems and other types that do not employ a fixed, central pivot.

As is well known in the art, each of the mobile towers 24, 26, 28, and 30 include wheels 32 and 34. At least one of the wheels 32 on each of the mobile towers 24, 26, 28, and 30 is preferably driven by a suitable drive motor 36 as is known in the art and discussed in more detail below. Generally, steerable wheels on an outer tower (not shown) are pivoted about an upright axis by a suitable steering motor (not shown) associated with the outer tower so that the outer tower of the irrigation system 10 follows a predetermined track presented by a buried cable or the like. As is also well known, each drive motor 36 for the mobile towers 24, 26, 28, and 30 is typically controlled by a suitable safety system (not shown) such that the motor 36 can be slowed, or completely shut down, in the event of the detection of an adverse circumstance.

As is also known in the art, each of the spans 16, 18, 20, and 22 includes a liquid carrying conduit 38, 40, 42, and 44 that is connected in fluid flow communication with all other conduits of the system to provide liquid along the length of the system to numerous sprinklers or other water emitting devices (not shown) in order to irrigate a field. The conduits 38, 40, 42, and 44 are each slightly arched or bowed upward when empty and are supported in such condition by truss-type frameworks 46, 48, 50, and 52 or other supports connected to the conduits 38, 40, 42, and 44 and disposed below the same.

Further, as is conventional, one or more high pressure sprayers or end guns 54 may be mounted to the end tower 30. The end gun 54 is typically activated at the corners of a field or other designated areas to increase the amount of land that can be irrigated, as is known by one of ordinary skill in the art. Additional elements, such as booster pumps (not shown), may be coupled with the end gun 54 to increase its range.

Figure 2:
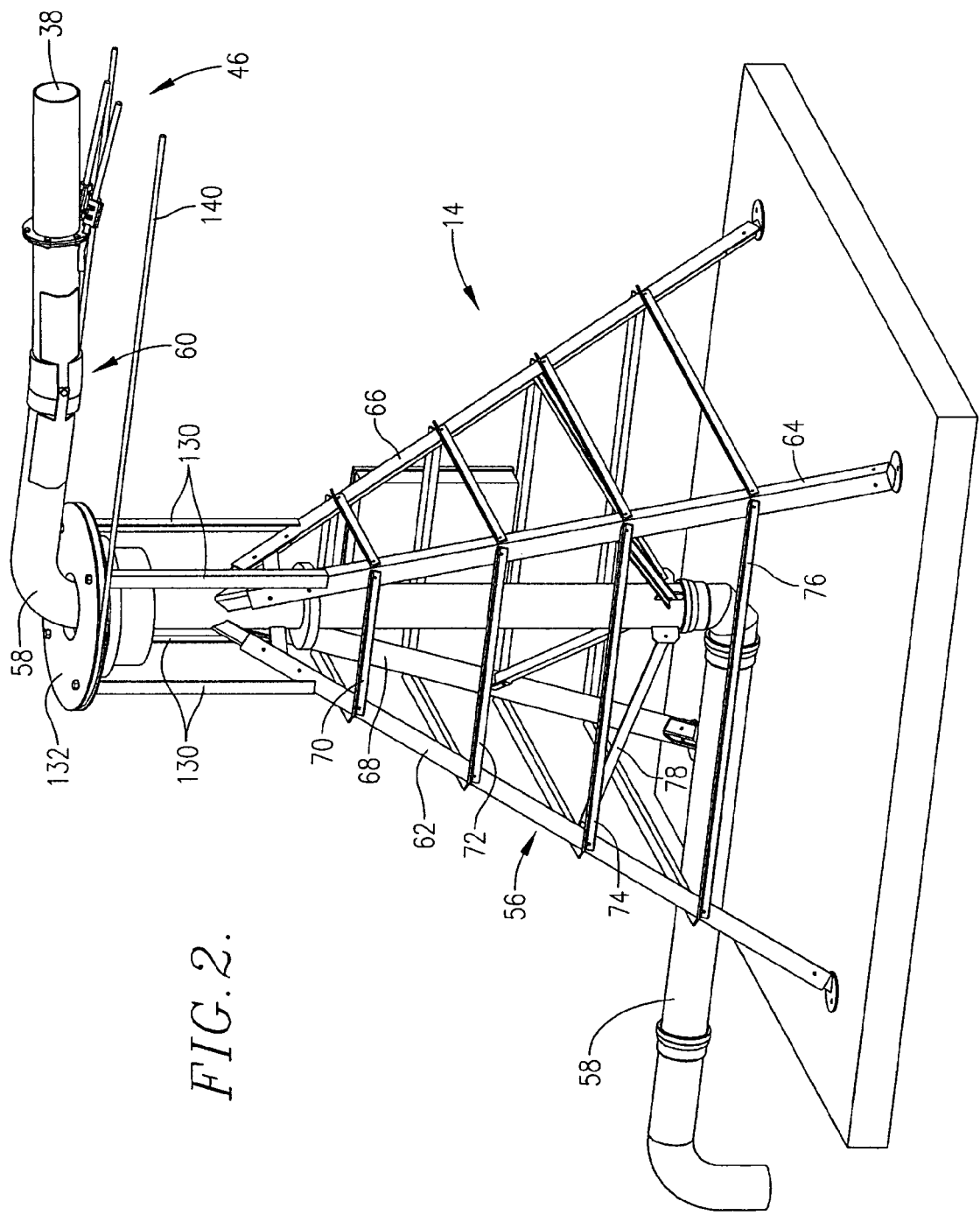
FIG. 2 is a fragmentary, perspective view of the center pivot of the solar powered irrigation system shown in FIG. 1, particularly illustrating in detail a portion of the solar panel direction control system, including a fixed center sheave and cable.

Turing now to FIG. 2, the central pivot 14 includes a stabilizing frame 56 that supports a source conduit 58. The source conduit 58 connects to the first liquid carrying conduit 38 at a junction 60. In the illustrated embodiment, the frame 56 includes support legs 62, 64, 66, and 68 disposed equidistantly around the source conduit 58 in a generally pyramid shape. Each adjacent pair of support legs 62, 64, 66, and 68 is connected by cross members 70, 72, 74, and 76, and each support leg 62, 64, 66, and 68 further includes an internal support member 78 that directly supports the source conduit 58. It will be readily appreciated by one of ordinary skill in the art that the shape and elements of such a supporting frame could take any suitable shape and number appropriate to support a source conduit and form a central pivot without departing from the teachings of the present invention.

Next, with reference to FIG. 3, the mobile tower 24 closest to the central pivot 14 will be described in greater detail. It is noted that only representative mobile tower 24 is depicted in detail for the sake of clarity and convenience, although it will be clear to one of ordinary skill in the art that the description of this mobile tower 24 is equally applicable to each of the other mobile towers 26, 28, and 30. The mobile tower 24 includes a pair of angle braces 80 and 82 that extend from a relatively common point of support for the conduit 38 of the span 16 in a generally downward and outward direction to the location of wheels 32 and 34, respectively. In the illustrated embodiment, angle brace 80 comprises side support members 84 and 86 that converge as they extend downwardly to the location of the wheel 32. The support members 84 and 86 are connected by cross members 88, 90, 92, and 94. In similar fashion, angle brace 82 comprises side support members 96 and 98 that converge as they extend downwardly to the location of the wheel 34. These support members 96 and 98 are likewise connected by cross members 100, 102, 104, and 106. A drive frame element 108 connects the lower ends of the angle braces 80 and 82, and extends generally horizontally therebetween.

As discussed briefly above, the motor 36 drives at least one wheel 32. In the illustrated embodiment, the motor 36 is mounted on the drive frame element 108, although a drive motor mounted to any other part of an irrigation machine is clearly within the ambit of the present invention. A housing 110 is depicted adjacent the motor 36, whereby such housing 110 covers a connection between the motor 36 and a drive shaft 112. The output of the motor 36 is drivingly interconnected to the drive shaft 112 to transmit the rotation from the motor 36 to the wheel 32. As will be readily appreciated by one of ordinary skill in the art, the wheel 34 could also be similarly driven, either by the same motor 36 or an additional such motor without departing from the teachings of the present invention.

Figure 3:
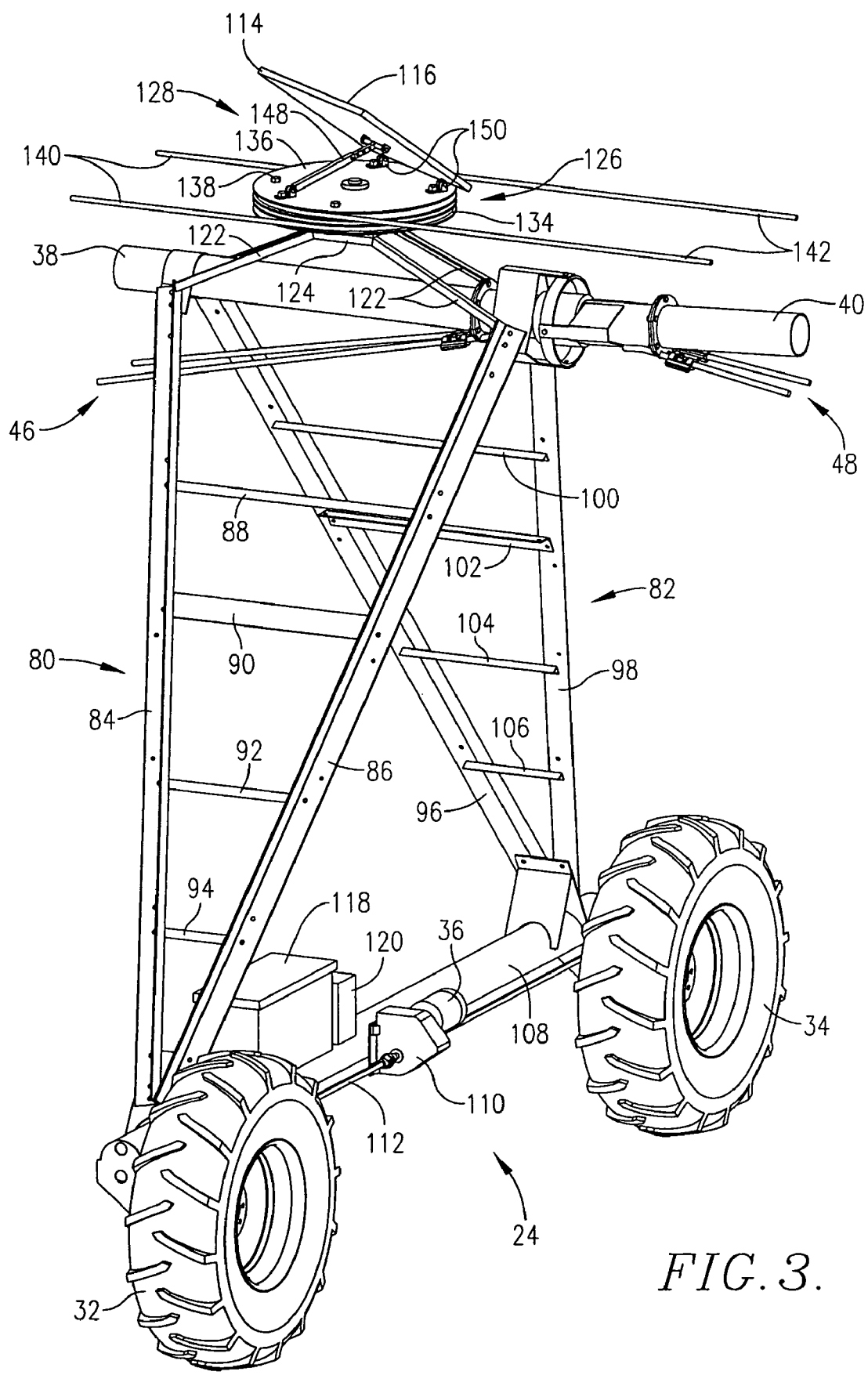
FIG. 3 is a fragmentary, perspective view of a mobile tower of the solar powered irrigation system shown in FIG. 1, particularly illustrating the components thereof, including a solar panel on a rotatable sheave of the solar panel direction control system, a battery, a power inverter, and a motor.

Returning now to FIG. 1 and with continued reference to FIG. 3, a solar panel 114 with a collecting surface 116 is depicted on top of each mobile tower 24, 26, 28, and 30 for collecting light energy from the sun and converting the light energy into electrical energy. One satisfactory solar panel for performing the collection and conversion desired is available from Kyocera Corporation, Solar Energy Division, of Kyoto, Japan. In the depicted embodiment, the collecting surface 116 of the solar panel 114 is comprised of an array of photovoltaic cells that directly convert the light energy into electrical energy, although any suitable array may be used without departing from the teachings of the present invention.

The solar panel 114 on each of the mobile towers 24, 26, 28, and 30 is in electrical communication with an electrical charge source 118 by wiring (not shown) or other suitable connection as known in the art. In the illustrated embodiment, the electrical charge source 118 is mounted on the drive frame element 108, although an electrical charge source mounted to any other part of an irrigation machine is clearly within the ambit of the present invention. In the illustrated embodiment, the electrical power source 118 comprises a rechargeable battery, although other conventional power supply elements, such as capacitors, direct wire conduits, or receptacles to receive the same, are within the ambit of the present invention.

The electrical charge source 118 is associated with the motor 36 to provide electrical power thereto via wiring (not shown) or other suitable connection as known in the art. It is noted that the electrical charge source 118, powered by electrical energy from the solar panel 114, could also provide power to other components of the irrigation system 10, such as a booster pump (not shown) or the end gun 54, without departing from the teachings of the present invention. In the illustrated embodiment, the electrical charge source 118 is connected first to a current inverter 120 and then to the motor 36. The current inverter 120 changes the flow of electric current from direct current supplied by the electrical charge source 118 to alternating current to power the motor 36. While the depicted embodiment includes the motor 36 driven by alternating current, and therefore includes the inverter 120 to supply the appropriate type of electrical current, it is clearly within the ambit of the present invention to provide an alternative motor driven by direct current that could be associated directly with the electrical charge source 118 without the need for the inverter 120.

As discussed above, the powering of the motor 36 turns the wheel 32 through the drive shaft 112 to move the mobile tower 24. The other mobile towers 26, 28, and 30 are driven in like manner to allow the main section 12 of the illustrated irrigation system 10 to move in a circle about the central pivot 14 to irrigate a field. The movement of the motor 36 on each mobile tower 24, 26, 28, and 30 is controlled by methods readily known by one of ordinary skill in the art. It is noted that the solar panel 114 and the motor 36 are sized for the requirements of each tower, as will be readily appreciated by one of ordinary skill in the art. Further, while the illustrated embodiment depicts the solar panel 114 and the motor mounted to the mobile tower 24, the mounting of such components elsewhere is clearly within the ambit of the present invention, although mounting locations on the particular tower being moved can limit the amount of wire or other connection medium necessary to maintain the components in electrical communication and makes use of structural elements that are already a part of the irrigation system 10.

With further reference to FIG. 3, the solar panel 114 on the illustrated embodiment is configured for rotational and tilting adjustment on the mobile tower 24 such that the collecting surface 116 of the solar panel 114 is moveable to correspond to the direction of incoming sunlight. Lifting supports 122 extend from the upper end of support members 84, 86, 96, and 98 of angle braces 80 and 82. A generally horizontal platform 124 is connected to the top end of each of the lifting supports 122. A rotation assembly 126 is rotatably coupled to the platform 124 about a vertical axis (not shown) for relative rotation therewith. As depicted, the solar panel 114 is mounted on the rotation assembly 126.

Preferably, although not necessarily, the relative angular position of the rotation assembly 126 is controlled by a direction control system 128. As shown in FIG. 1 of the illustrated embodiment, the direction control system 128 links the central pivot 14 and each of the mobile towers 24, 26, 28, and 30 so that the solar panel 114 on each of the mobile towers 24, 26, 28, and 30 are continuously aligned in the same direction while the main section 12 of the irrigation system 10 moves in a generally circular path through a field.

With reference to FIG. 2, a riser 130 extends upward from each of the support legs 62, 64, 66, and 68 of the center pivot frame 56. A fixed sheave 132 is generally horizontally mounted above the center pivot frame 56 by a fast connection to the top of each of the risers 130. Next, with reference to FIG. 3, the rotation assembly 126 of the illustrated embodiment comprises a pair of rotatable sheaves, i.e., lower sheave 134 and upper sheave 136. The sheaves 134 and 136 are fixed relative to one another with bolts 138 or other known fasteners so that the sheaves 134 and 136 are prevented from rotation relative to one another. An endless cable 140 wraps around the fixed sheave 132 on the central pivot 14 and also around the lower sheave 134 of the rotation assembly 126. In like manner, another endless cable 142 wraps around the upper sheave 136 of the rotation assembly 126 and also around a lower sheave (not shown) of a similar rotation assembly (not shown in detail) on the next mobile tower 26. In like manner, another cable 144 connects the rotation assemblies of mobile towers 26 and 28, and another cable 146 connects the rotation assemblies of mobile towers 28 and 30.

The cable 140 is maintained in tension such that, as the first span 16 of the irrigation system 10 rotates about the central pivot 14, the cable 140 causes the rotation assembly 126 on the first mobile tower 24 to rotate in the opposite direction relative to the platform 124 such that the facing direction of the collecting surface 116 of the solar panel 114 remains constant. In like manner, the cable 142 is also maintained in tension such that, as the next span 18 of the irrigation system 10 also rotates about the central pivot 14, the cable 142 causes the rotation assembly (not shown in detail) on the second mobile tower 26 to rotate such that the facing direction of the collecting surface 116 of the solar panel 114 remains constant. In like manner, cables 144, and 146 are also maintained in tension and similarly cause the collecting surfaces 116 of the solar panels 114 on mobile towers 28 and 30 to remain constant throughout rotation of the irrigation system 10.

As an example, irrigation systems used in the northern hemisphere may be configured to have the rotation assembly 126 on each mobile tower 24, 26, 28, and 30 always direct the collecting surface 116 of the solar panel 114 to face a generally southern direction. Thus, as the main span 12 of the irrigation system 10 rotates about the central pivot 14, tension in the cables 140, 142, 144, and 146 cause each rotation assembly 126 to rotate in the opposite direction as the main span 12 so that as the direction of the main span 12 continuously changes, the facing direction of the collecting surface 116 of each solar panel 114 remains facing a southern direction to be exposed to the most incoming sunlight.

It is noted that the direction control system 128 could take different forms without departing from the teachings of the present invention. For example, the sheave and cable arrangement could alternatively be formed with sprockets and an endless connecting chain between a central pivot and first tower and between each successive set of towers to maintain the collecting surfaces 116 of the solar panels 114 facing a constant direction as the main span 12 of the irrigation system 10 rotates about the central pivot 14.

It is further noted that the direction control system 128 could also take additional, even non-mechanical, forms without departing from the teachings of the present invention. For example, it is clearly within the ambit of the present invention to provide an alternate embodiment (not shown) of a direction control system that controls the rotation of each rotation assembly on the mobile towers individually. Such a system could use a conventional position encoder at the central pivot 14 to determine the angular position of the first span 16; it is noted that such an encoder is typically used for determining such angular position of the spans for a variety of control parameters. One satisfactory encoder for determining the angular position of the first span as noted above is a Zimmatic encoder, available from Lindsay Corporation of Lindsay, Nebr.

The angular position from an encoder could be used with a programming controller to force the solar panels 114 to turn to follow the sun throughout the day based on directional values from a lookup table accessed by the programming controller, wherein such a lookup table could additionally provide directional values based on time and date information. Alternatively, the angular position from the encoder could be used with a programming controller to force the solar panels 114 to turn to follow the sun throughout the day based on relative position of the spans in relation to a target direction for the solar panels 114. When using a programming controller to force the solar panels 114 to face a particular direction, the rotation assembly 126 on each of the mobile towers 24, 26, 28, and 30 could be turned individually by a stepper motor or other conventional device for setting and maintaining rotational position.

With continued reference to FIG. 3, the solar panel 114 of the illustrated embodiment is configured for tilting adjustment relative to the generally horizontal disposition of the rotation assembly 126. As depicted in detail in FIG. 3, the side of the solar panel 114 opposite the collecting surface 116 is connected to the top of the upper sheave 136 of the rotation assembly 126 by an adjustable-length strut 148 and a plurality of hinges 150. Although not shown in detail, the length of the strut 148 is changeable in a manner well known in the art, such as by locking a pin in a hole in a portion of the strut 148. It will be readily appreciated by one of ordinary skill in the art that elongating the length of the strut 148 will force the solar panel 114 to pivot at hinges 150 to a more vertically upright position, while shortening the length of the strut 148 will force the solar panel 114 to pivot the opposite direction at hinges 150 to a more vertically flat position.

In the illustrated embodiment, the length of the strut 148, and therefore the vertical tilt of the solar panel 114, are set based on the general global position of the use of the irrigation system 10. In general, the closer to the equator the use of the irrigation machine 10, the more vertically flat the solar panel 114 can be positioned to receive incoming sunlight and, conversely, the farther from the equator the use of the irrigation machine 10, the more vertically upright the solar panel 114 can be positioned to receive incoming sunlight. As depicted in FIG. 3, once the tilt angle has been manually set, it remains constant as the irrigation system 10 moves through the field, although continuous adjustment of the tilt angle (similar to the continuous adjustment of the rotation discussed above) is clearly within the ambit of the present invention.

It is noted that the tilting adjustment of the solar panel 114 could also take different forms without departing from the teachings of the present invention. For example, the adjustable-length strut 148 could alternatively take the form of an electric motor (not shown), such as a stepper motor, to control the tilt position of the solar panel 114 relative to a generally horizontal base. Such an electronic system could be used to vary the tilt of the solar panel 114 depending on the time of day in addition to the location of use of the irrigation system 10.

It is further noted that the tilt adjustment of the solar panel 114 could also be used in conjunction with additional control devices without departing from the teachings of the present invention. For example, it is clearly within the ambit of the present invention to provide an alternative control system (not shown) whereby a light intensity sensor is used to continuously track the direction of incoming sunlight and send a signal to an electronic tilt adjustment mechanism. Such a light tracking system could also be used in conjunction with the rotation assembly 126 as another example of a direction control system. Thus, it is entirely within the ambit of the present invention to provide a light tracking system that tracks the incoming sunlight and sends a signal to electric motors, such as stepper motors, to control (either individually or as a group) the rotation and/or tilt angle of the solar panels 114 in an irrigation machine.

Turning now to FIG. 4, an alternative embodiment of an irrigation system 210 is depicted as a center pivot irrigation system, similar in many respects to irrigation system 10 of FIG. 1. For brevity and consistency, similar elements between the irrigation system 10 and the alternative irrigation system 210 are numbered in similar fashion, but numbered differently by an order of two hundred. Additionally, only the differences between the embodiments will be explained in detail, as the vast majority of the elements and functions will be the same between these illustrated embodiments. The irrigation system 210 broadly includes a main section 212 and a central pivot 214, the central pivot 214 having access to a well, water tank, or other source of fluids (not shown).

The main section 212 includes a number of interconnected spans 216, 218, and 220 supported by mobile towers 224 and 226. Those of ordinary skill in the art will appreciate that the irrigation system 210 may include any number of spans and mobile towers. It will also be recognized that the principles of the present invention are not limited to use with a center pivot system, but may also be employed with other types of irrigation systems, including for example, lateral move systems and other types that do not employ a fixed, central pivot.

As is well known in the art, each of the mobile towers 224 and 226 include wheels 232 and 234. At least one of the wheels 232 on each of the mobile towers 224 and 226 is preferably driven by a suitable drive motor 236 as is known in the art. Each of the spans 216, 218, and 220 includes a liquid carrying conduit 238, 240, and 242 that is connected in fluid flow communication with all other conduits of the system to provide liquid along the length of the system to numerous sprinklers or other water emitting devices (not shown) in order to irrigate a field. The conduits 238, 240, and 242 are each slightly arched or bowed upward when empty and are supported in such condition by truss-type frameworks 246 and 248, or other supports connected to the conduits 238, 240, and 242 and disposed below the same.

The mobile towers 224 and 226 of the alternative irrigation system 212 are generally similar to those of irrigation system 10 and shown in FIG. 3. In the illustrated embodiment, the motor 236 is mounted on a drive frame element (not shown in detail) of the mobile towers 224 and 226 and is drivingly connected to a wheel 232 so that the output of the motor 236 drives the wheel 232 to move the mobile tower 224 and 226. Similar to the irrigation system 10 described above, a solar panel 314 is provided on top of each of the mobile towers 224 and 226 for collecting light energy from the sun and converting the light energy into electrical energy. The electrical energy from the solar panel 314 is carried by wires or other appropriate conduits (not shown) to an electronic charge source 318, such as a rechargeable battery or the like. In the illustrated embodiment, a current inverter 320 is connected in electrical communication between the electronic charge source 318 and the motor 236 to change the electric current from direct current to alternating current, although it will be readily apparent to one of ordinary skill in the art that such an inverter 320 could be removed if direct current motors are used.

Compared to the moveable solar panels 114 of the irrigation system 10 depicted in FIGS. 1-3, the solar panels 314 of the alternative irrigation system 210 depicted in FIG. 4 are not mounted on rotation assemblies, nor are they configured for tilting adjustment. In this illustrated embodiment, the solar panels 314 are mounted to the mobile towers 224 and 226 in a fixed, generally horizontal disposition. In this embodiment, the mounting of the solar panels 314 to the mobile towers 224 and 226 is simplified as there is no adjustment to be made or controlled to align the solar panels 314 with the incoming sunlight.

This alternative embodiment is satisfactory for using solar power to drive the motors of an irrigation machine and is particularly effective in geographical areas that are relatively close to the equator or where the sun is high in the sky such that a generally horizontal disposition of the solar panels 314 receives adequate incoming sunlight. This arrangement is also effective in areas where the adjustment of the solar panels 314 would be approximately generally horizontal a majority of the time and/or adjustment would be overly burdensome relative to the added exposure to incoming sunlight. Additionally, this alternative embodiment is suited for lateral move irrigation systems (not shown) that do not rotate about a central pivot, as the rotational orientation of the solar panels would not change as such a system moves laterally across a field.

The method of moving the mobile tower 24 of the irrigation system 10 should be apparent from the foregoing description and, therefore, will be described here only briefly. In particular, on each mobile tower 24 (using this mobile tower as an example, as it is depicted in detail in FIG. 3), the collecting surface 116 of the solar panel 114 collects light energy from the incoming sunlight and converts the light energy into electrical energy. The electrical energy is transmitted to an electrical charge source 118, such as a rechargeable battery or the like. The electrical energy is then transmitted to the motor 36 that drives the wheel 32 of the mobile tower 24 through a drive shaft 112, as will be readily appreciated by one of ordinary skill in the art.

It is noted, as above, that in the illustrated embodiment, the electrical energy is transmitted to a current inverter 120 between the electrical charge source 118 and the motor 36. The inverter 120 changes the form of the electrical current from direct current to alternating current in order to power an alternating current motor. Alternatively, a direct current motor could be used instead and no passing of the electrical current through an inverter 120 would be required, as will also be readily appreciated by one of ordinary skill in the art.

Selectively, as depicted in the illustrated embodiment of FIGS. 1-3, the solar panel 114 moves to collect the most incoming sunlight by rotating and/or tilting to face the sun. The rotational movement of the solar panel 114 is dictated by a direction control system 128 and the tilt of the solar panel 114 is dictated by an adjustable-length strut 148 and set of hinges 150, although either or both movement systems could alternatively be carried out by electronic controls, and even directed by electronic sensors, without departing from the teachings of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. In an irrigation system having a liquid conduit that spans mobile towers, each of the mobile towers including at least one ground-engaging wheel, the improvement comprising:
    a solar panel having a collecting surface,
    said solar panel operable to collect light energy from the sun and convert the light energy into electrical energy;
    an electrical charge source in electrical communication with the solar panel,
    said electrical charge source receiving the electrical energy from the solar panel;
    a motor in electrical communication with the electrical charge source,
    said motor receiving the electrical energy from the electrical charge source,
    said motor driving the ground-engaging wheel,
    said irrigation system comprising a center pivot system, wherein the liquid conduit extends radially outwardly from a central pivot;
    a rotation assembly,
    said solar panel being attached to the rotation assembly,
    said rotation assembly being rotatable about a vertical axis, such that the collecting surface of the solar panel can turn to face the sun as the irrigation system rotates about the pivot; and
    a direction control system,
    the relative angular position of said rotation assembly being controlled by the direction control system,
    said rotation assembly comprising a platform raised above the top of the liquid conduit by supporting members and a rotating element coupled to the platform for relative rotation therewith,
    said rotating element including an arcuate periphery,
    said direction control system comprising a fixed element with an arcuate periphery on the central pivot and an endless member wrapped around the periphery of the fixed element and also around the periphery of the rotating element of the rotation assembly,
    said endless member interconnecting the fixed element and the rotating element such that as the irrigation machine rotates about the central pivot, the endless member causes the rotation assembly to rotate relative to the mobile tower such that the facing direction of the collecting surface of the solar panel remains constant.

2. In the irrigation system as claimed in claim 1; and
    a tilt assembly,
    said solar panel being attached to the tilt assembly,
    said tilt assembly being tiltable about a horizontal axis, such that the collecting surface of the solar panel can tilt to correspond to the position of the sun relative to the horizon.

3. In the irrigation system as claimed in claim 2,
    said tilt assembly comprising a mounting base, an adjustable-length strut, and a hinge,
    said mounting base being the rotating element of the rotation assembly,
    said hinge connecting the mounting base and an edge of the solar panel such that as the length of the strut is elongated or shortened, the hinge causes the solar panel to tilt more vertically upright or more vertically flat, respectively, relative to the mounting base.

4. In an irrigation system having a liquid conduit that spans mobile towers, each of the mobile towers including at least one ground-engaging wheel, the improvement comprising:
    a solar panel having a collecting surface,
    said solar panel operable to collect light energy from the sun and convert the light energy into electrical energy;
    an electrical charge source in electrical communication with the solar panel,
    said electrical charge source receiving the electrical energy from the solar panel;
    a motor in electrical communication with the electrical charge source,
    said motor receiving the electrical energy from the electrical charge source,
    said motor driving the ground-engaging wheel; and
    a tilt assembly,
    said solar panel being attached to the tilt assembly,
    said tilt assembly being tiltable about a horizontal axis, such that the collecting surface of the solar panel can tilt to correspond to the position of the sun relative to the horizon,
    said tilt assembly comprising a mounting base, an adjustable-length strut, and a hinge,
    said mounting base being attached to the mobile tower,
    said hinge connecting the mounting base and an edge of the solar panel such that as the length of the strut is elongated or shortened, the hinge causes the solar panel to tilt more vertically upright or more vertically flat, respectively, relative to the mounting base.

5. In the irrigation system as claimed in claim 4,
said tower including a drive frame member at the lower end thereof, said drive frame member adjacent the ground-engaging wheel,
said motor being attached to the drive frame member for rigid support thereon.

6. In the irrigation system as claimed in claim 5,
said tower including a drive frame member at the lower end thereof, said drive frame member adjacent the ground-engaging wheel,
said electrical charge source being attached to the drive frame member for rigid support thereon.

7. In the irrigation system as claimed in claim 4,
said electrical charge source at least temporarily storing electrical energy from the solar panel.

8. In the irrigation system as claimed in claim 7,
said electrical charge source comprising a battery,
said battery being charged by receiving the electrical energy from the solar panel.

9. In the irrigation system as claimed in claim 4, said solar panel comprising an array of photovoltaic cells.

10. In the irrigation system as claimed in claim 4,
said irrigation system comprising a center pivot system, wherein the liquid conduit extends radially outwardly from a central pivot.

11. In the irrigation system as claimed in claim 10; and
a rotation assembly,
said solar panel being attached to the rotation assembly,
said rotation assembly being rotatable about a vertical axis, such that the collecting surface of the solar panel can turn to face the sun as the irrigation system rotates about the pivot.

12. In the irrigation system as claimed in claim 11; and
a direction control system,
the relative angular position of said rotation assembly being controlled by the direction control system.

13. In the irrigation system as claimed in claim 4; and
an inverter in electrical communication with the electrical charge source and also with the motor,
said electrical energy being transmitted from the electrical charge source to the inverter as direct current,
said inverter changing the flow of the electric current from direct current to alternating current and transmitting the alternating current to the motor,
said motor being powered by the alternating current.

14. A method of moving a mobile tower of an irrigation system, said method comprising the steps of:
collecting light energy with a solar panel;
converting the light energy into electrical energy;
transmitting the electrical energy to a motor on a mobile tower; and
driving the ground-engaging wheels of the mobile tower with the motor,
said collecting step including the step of aligning the solar panel with the position of the sun to most directly expose the solar panel to the incoming sunlight,
said aligning step including the step of rotating the solar panel about a vertical axis so that a collecting surface of the solar panel continuously corresponds with the direction of incoming sunlight as the irrigation system moves through a field,
said rotating step including the step of controlling the relative position of the solar panel with a direction control system,
said controlling step including the step of wrapping an endless member around an arcuate periphery of a fixed element on a central pivot of the irrigation system and also around a rotating element attached to the solar panel, such that as the irrigation machine rotates about the central pivot, the endless member causes the solar panel to rotate relative to the mobile tower to maintain the facing direction of a collecting surface of the solar panel aligned with the sun.

15. The tower moving method as claimed in claim 14,
said aligning step including the step of tilting the solar panel about a horizontal axis so that the angle of the collecting surface of the solar panel relative to the horizon continuously corresponds with the direction of incoming sunlight relative to the horizon.

16. The tower moving method as claimed in claim 14,
said transmitting step including the step of inverting the flow of electrical energy from direct current to alternating current and powering the motor with alternating current.

17. In an irrigation system having a liquid conduit that spans mobile towers, each of the mobile towers including at least one ground-engaging wheel, the improvement comprising:
a solar panel having a collecting surface,
said solar panel operable to collect light energy from the sun and convert the light energy into electrical energy;
an electrical charge source in electrical communication with the solar panel,
said electrical charge source receiving the electrical energy from the solar panel; and
a motor in electrical communication with the electrical charge source,
said motor receiving the electrical energy from the electrical charge source,
said motor driving the ground-engaging wheel,
said irrigation system comprising a center pivot system, wherein the liquid conduit extends radially outwardly from a central pivot;
a rotation assembly,
said solar panel being attached to the rotation assembly,
said rotation assembly being rotatable about a vertical axis, such that the collecting surface of the solar panel can turn to face the sun as the irrigation system rotates about the pivot; and
a direction control system,
the relative angular position of said rotation assembly being controlled by the direction control system.

18. In the irrigation system as claimed in claim 17; and
a tilt assembly,
said solar panel being attached to the tilt assembly,
said tilt assembly being tiltable about a horizontal axis, such that the collecting surface of the solar panel can tilt to correspond to the position of the sun relative to the horizon.

19. In the irrigation system as claimed in claim 18,
said tilt assembly comprising a mounting base, an adjustable-length strut, and a hinge,
said mounting base being the rotating element of the rotation assembly,
said hinge connecting the mounting base and an edge of the solar panel such that as the length of the strut is elongated or shortened, the hinge causes the solar panel to tilt more vertically upright or more vertically flat, respectively, relative to the mounting base.

* * * * *